United States Patent [19]

Garvey

[11] 4,148,557

[45] Apr. 10, 1979

[54] ADJUSTABLE FIBER OPTIC CONNECTOR

[75] Inventor: Steven E. Garvey, Sunnyvale, Calif.

[73] Assignee: Hewlett-Packard Company, Palo Alto, Calif.

[21] Appl. No.: 814,606

[22] Filed: Jul. 11, 1977

[51] Int. Cl.$^2$ ............................................... G02B 5/14
[52] U.S. Cl. .................................................. 350/96.20
[58] Field of Search ................ 350/96.20, 96.21, 96.22

[56] References Cited

U.S. PATENT DOCUMENTS

| 3,946,467 | 3/1976 | Lukas et al. | 350/96.20 X |
| 3,954,338 | 5/1976 | Hennel et al. | 350/96.21 |
| 4,047,797 | 9/1977 | Arnold et al. | 350/96.21 |

Primary Examiner—Rolf G. Hille
Attorney, Agent, or Firm—F. D. LaRiviere

[57] ABSTRACT

The retainer sleeve of a ferrule suitable for very small diameter optical fibers is coupled to a connector barrel so that, after the ferrule and optical fiber have been assembled, the position of the optical fiber end with the coupling surface of the ferrule may be adjusted. The connector barrel also includes means for securely locking the adjusted position of the optical fiber in the ferrule.

3 Claims, 1 Drawing Figure

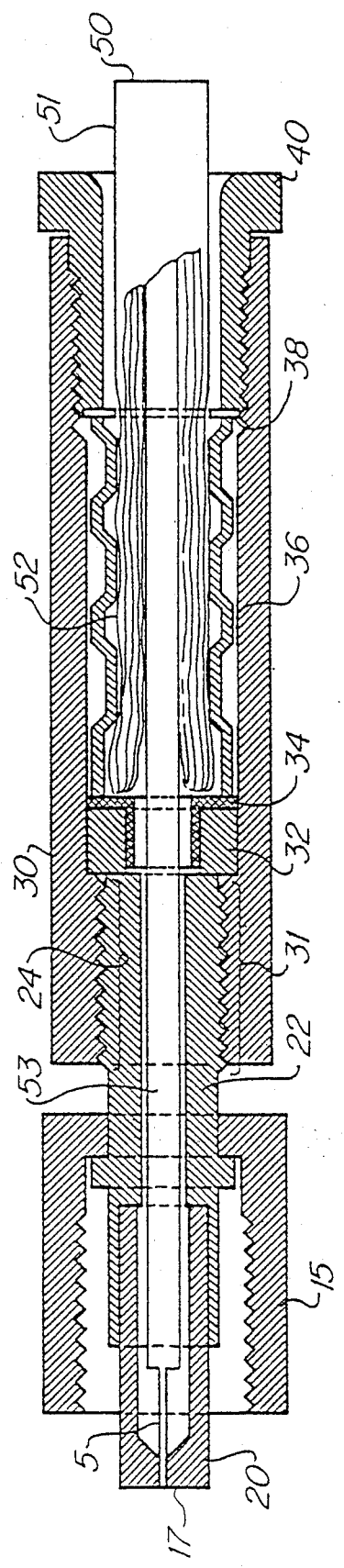

ADJUSTABLE FIBER OPTIC CONNECTOR

BACKGROUND OF THE INVENTION

In end-to-end coupling of two optical fibers, the closer together the two fiber ends can be brought and aligned on their common center-line, the less light or power is lost. In connectors for such end-to-end coupling having ferrules to retain the optical fibers, the cleaved end of an optical fiber is initially just flush with the coupling surface of the ferrule. Thereafter, when the rear or cable-end portion of the ferrule is crimped to the jacket of the optical fiber cable, the cleaved end of the optical fiber may recede into the ferrule, and hence, back from the coupling surface thereof. Such a connector assembly is described in co-pending U.S. patent application Ser. No. 698,392, now U.S. Pat. No. 4,101,198, entitled "Fiber Optic Connector", filed June 21, 1976 by Earl R. Heldt, and assigned to the assignee hereof.

Co-pending U.S. patent application Ser. No. 792,375, now U.S. Pat. No. 4,114,979, entitled "Improved Fiber Optic Connector", filed Apr. 29, 1977 by Earl R. Heldt, also assigned to the assignee hereof, incorporates improvements which provide adjustment means for adjusting the position of the optical fiber end flush with the coupling surface of the ferrule during assembly. However, since the final step of assembly involves the crimping of an outer sleeve to the outer jacket of the cable, there is no means for readjusting the position of the optical fiber end with the coupling surface of the ferrule thereafter. Readjustment may be desirable (1) to improve production yield, since adjustment during initial assembly may be faulty or (2) to lengthen service life in the field, since the optical fiber may recede into the ferrule away from the coupling surface thereof with hard or extended use, or use in varying ambient temperatures and environments.

SUMMARY OF THE INVENTION

The present invention relates to fiber optic connectors generally of the type described in U.S. patent application Ser. No. 792,375, now U.S. Pat. No. 4,114,979, entitled "Improved Fiber Optic Connector" filed June 21, 1976 by Earl R. Heldt, which is incorporated by reference as amended as if fully set forth herein. A fiber optic connector constructed according to the present invention includes a barrel coupled to the ferrule, which retains the optical fiber, and the barrel enclosing a crimp sleeve and washers, and coupled at the other end to a lock nut for securely locking the adjusted position of the optical fiber in the ferrule.

DESCRIPTION OF THE DRAWING

The drawing is a cross-sectional view of an adjustable fiber optic connector constructed according to the principles of the present invention.

DESCRIPTION OF THE PREFERRED EMBODIMENT

Referring to the drawing, optical fiber 5 is retained in ferrule assembly 20 which may be of any suitable design but preferable of the configuration described in detail in the above-incorporated patent application. Ferrule retainer sleeve 22 has outside threaded portion 24 for coupling to inside threads 31 at one end of connector barrel 30. Crimp sleeve 36, which is crimped to fiber optic cable 50, is tightened against washer 34, which abuts rubber bushing 32 for engaging retainer sleeve 22, by lock nut 40 via interface washer 38. Fiber optic cable 50 also includes outer jacket 51, Kevlar strength members 52 and inner jacket 53.

In order to provide locking of the adjusted position of optical fiber 5 in ferrule assembly 20, crimp sleeve 36 should be securely affixed to fiber optic cable 50. To assure that crimp sleeve 36 does not slip on cable 50 after crimping, before crimping sleeve 36 to the cable, outer jacket 51 is trimmed to expose Kevlar 52 to a length approximately equal to the length of sleeve 36. The exposed portion of Kevlar 52, a strength enhancing layer of stranded material sandwiched between inner jacket 52 and outer jacket 51, is folded back over external surface of outer jacket 51 and held in place by sleeve 36. Thus, two layers of Kevlar 52 are separated by outer jacket 51 within sleeve 36 prior to crimping of that sleeve. Before sleeve 36 is crimped, washer 38 and lock nut 40 are mounted on cable 50. After sleeve 36 is crimped, washer 34, and rubber bushing 32 for abutting the crimp sleeve against ferrule assembly 20 are mounted on exposed inner jacket 53, and barrel 30 is slipped over the entire assembly, as shown. After ferrule assembly 20 is coupled to optical fiber 5, barrel 30 is coupled to ferrule 20 at threaded portions 24 and 31, respectively, and the cleaved end of optical fiber 5 is adjusted to be just flush with coupling surface 17 of ferrule 20. Locknut 40 is coupled to the other end of barrel 30 and tightened to lock the adjusted position of optical fiber 5 in ferrule assembly 20.

I claim:

1. An adjustable fiber optic connector for end-to-end connection of individual optical fiber cable having a cleaved optical fiber, inner and outer jackets and stranded strength member between said jackets, said connector comprising:
    a ferrule, having a coupling surface, for retaining the optical fiber and inner jacket;
    a barrel having coupling means for coupling to the ferrule and for adjusting the cleaved end of the optical fiber with the coupling surface of the ferrule;
    a crimp sleeve crimped to the optical fiber cable within the barrel;
    a bushing for abutting the crimp sleeve against the ferrule within the barrel; and
    locking means, coupled to the barrel and crimp sleeve for locking the adjusted position of the optical fiber in the ferrule.

2. An adjustable fiber optic connector as in claim 1 wherein the crimp sleeve contains two layers of stranded strength member separated by the outer jacket.

3. An adjustable fiber optic connector as in claim 1 wherein the locking means comprise threaded means including a washer for interface to the crimp sleeve for tightening the crimp sleeve against the bushing.

* * * * *